Jan. 29, 1946. J. C. NICHOLSON 2,393,867
SIPHON TUBE
Filed Feb. 15, 1944
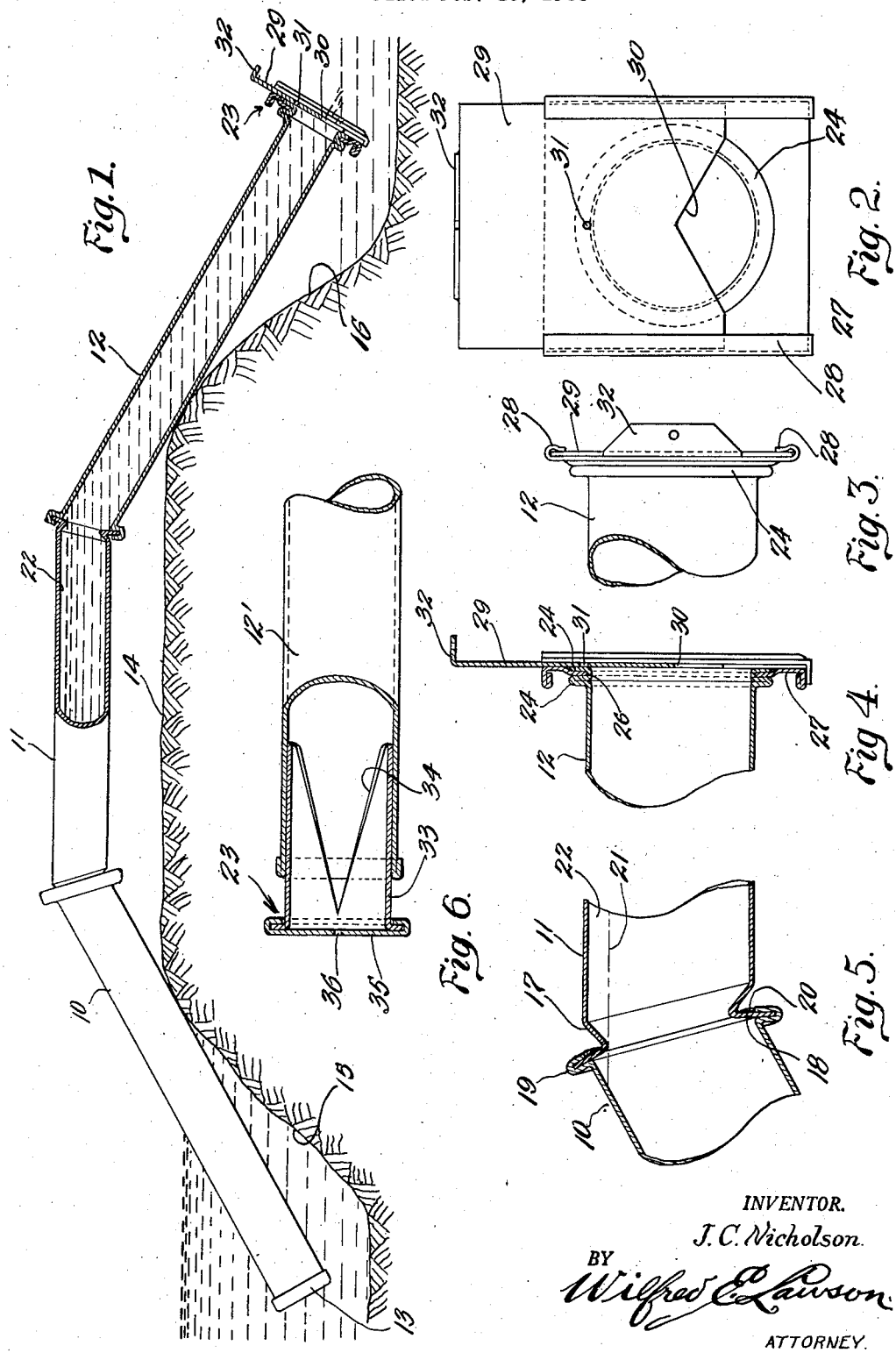
INVENTOR.
J. C. Nicholson.
BY
Wilfred E. Lawson
ATTORNEY.

Patented Jan. 29, 1946

2,393,867

UNITED STATES PATENT OFFICE 2,393,867

SIPHON TUBE

James C. Nicholson, Davis, Calif.

Application February 15, 1944, Serial No. 522,495

3 Claims. (Cl. 137—20)

This invention relates generally to improvements in siphoning tubes or pipes and pertains more particularly to an improved siphon pipe designed for use in those agricultural districts where use is made of irrigation ditches for supplying necessary moisture to growing crops.

At the present time use is made of siphon pipes for effecting the transfer of water from a main water supply or irrigation ditch, across an intervening strip of land into an auxiliary ditch, such pipe or tube having a sufficient longitudinal curvature or bend to travel the said intervening strip of land between the ditches so that one end of the pipe will be submerged in the main ditch and the other end will be arranged for discharge into the auxiliary ditch. The type of pipe at present used is highly unsatisfactory for the reason that the joints between the sections of which the siphon tube or pipe is made up are not properly designed to withstand the strains imposed upon the pipe in its use and in addition the design of the pipe is such that it cannot be relied upon to maintain a constant uninterrupted flow.

A principal object of the present invention is to provide a sectional siphon tube or pipe in which a novel means is provided for coupling together the ends of the central pipe section with the end section in such a manner that the joints will remain tight as long as the siphon tube is otherwise serviceable, regardless of the strains imposed upon the joints as a result of the manipulations necessary for the establishment of siphonic action.

Another object of the invention is to provide a siphon pipe of the character stated in which the central section has its ends formed in a novel manner which assists in the maintenance of a constant and uninterrupted flow of water through the pipe.

Still another object of the invention is to provide a novel shut-off valve means at the discharge end of the siphon tube, which is strong and durable, easily adjusted for regulating the flow of water as desired, and designed to give notice to the user when the pipe is filled with water and ready to start the siphoning action.

The invention will be best understood from a consideration of the following detailed description taken in connection with the accompanying drawing forming a part of the application, with the understanding that minor changes and modifications may be made in the structure so long as such changes and modifications mark no material departure from the salient features of the invention as expressed in the appended claims.

In the drawing:

Figure 1 illustrates the siphon tube of the present invention partly in elevation and partly in longitudinal section, the tube being shown in position for use.

Figure 2 is a view in end elevation of one embodiment of control valve for the discharge end of the tube.

Figure 3 is a view in top plan of the valve shown in Figure 2.

Figure 4 is a vertical longitudinal section through a portion of the discharge end of the tube and the valve.

Figure 5 is a sectional view on an enlarged scale of a joint between an end of the central section of the siphon tube and an end section.

Figure 6 is a detailed sectional view of another embodiment of control valve for the discharge end of the tube.

Referring now more particularly to the drawing it will be seen upon reference to Figure 1, that the siphon tube comprises the three sections, 10, 11 and 12. These sections may be made of any suitable material and the free or inlet end of the tube end section 10 is rolled or otherwise suitably turned back as indicated at 13 to provide desired reinforcement for the end of the pipe section. As will be readily apparent the pipe section 10 forms the inlet end portion of the siphon tube while the pipe 12 forms the outlet end portion, the intermediate portion 11 being disposed substantially horizontally across an earth bank 14 which separates the water supply canal or reservoir 15 from the irrigation distribution ditch 16.

In accordance with the present invention the central pipe 11 is pressed inwardly or constricted as indicated at 17, such constricted or impressed portions completely encircling the pipe as is clearly shown in Figure 5 and being located inwardly from the end edges of the pipe.

The terminus of the pipe 11 at each end is defined by the relatively wide outwardly extending flange 18 which is oblique to the longitudinal axis of the pipe.

This flange 18 extends across the end of the adjacent terminal pipe of the siphon tube as illustrated in Figure 5 and such end of the terminal pipe section is turned outwardly and then bent back across the edge of the flange as indicated at 19 to form with the flange a locking seam between the two pipe ends. This seam is then further tightened or made water and airtight by the application of solder between the free edge of the portion 19 of the seam and the flange 18 as indicated at 20.

While the over-all diameters of the three pipe sections making up the siphon tube are the same it will be noted upon reference particularly to Figure 5 that the inside diameter of each end of the central pipe section 11 at the narrowest part of the constriction 17 is considerably less than the inside diameter of the pipe 11 or of the pipes 10 and 12. Because of this construction when the siphon tube is filled with water and in use as shown in Figure 1, an action is believed to occur within the pipe which causes the flowing water to envelop any air which may enter as a result of vortices developed at the inlet end, due to a low head differential, and carry such air through in small bubbles, so that the siphonic action will not be broken.

At the discharge end of the pipe section 12 the passage of water outwardly through such end is controlled by the valve which is generally designated 23, one form of valve being illustrated in Figures 1 to 4 inclusive while a second form is illustrated in Figure 6.

In the form of the valve illustrated in Figures 1 to 4 the material of the pipe section 12 at the discharge end is crimped to form the space encircling flanges 24 which provide the encircling channel 25. Pressed tightly in this channel 25 is the edge portion of an opening 26 formed in a guide plate 27, opposite longitudinal edges of which plate are bent back to form the resilient guide flanges 28.

Slidably held tightly against the outer face of the supporting plate 27, by the resilient flanges 28, is the valve plate 29, opposite longitudinal edges of which engage between the flanges 28 and the plate 27 as shown in Figure 3. This valve plate is pressed tightly against the outer one of the two flanges 24 which forms a part of the pipe 12. Thus, it will be readily apparent, when the valve plate 29 is moved downwardly to a position where it fully covers the outlet end of the pipe section 12, the discharge of water from such section will be cut off.

The lower edge of the valve plate 29 is provided with the V shaped cut-out portion or notch 30, and at approximately the center of the plate 29 is a small opening 31, the purpose of which will be hereinafter described. The top edge of the plate is provided with the out-turned flange 32 which provides a convenient hand-hold means for facilitating shifting the valve plate 29 up or down as desired.

As will be readily seen upon reference to Figure 2, as the valve plate is moved up the apex portion of the notch 30 will first provide a very small outlet opening which will be increased in size as the valve plate is further moved upwardly until finally the entire discharge end of the pipe section 12 may be uncovered.

Another form of the valve unit 23 is illustrated in Figure 6. In this form the discharge pipe section is designated 12' and the valve structure comprises a short pipe section 33 of an over-all diameter sufficient to snugly fit in the outlet end of the pipe 12 as shown. The inner end of this valve pipe 33 is open and the wall of the valve pipe is provided with the long V notch 34, the apex of which is adjacent to the outer end of the pipe section 33. Such outer end is closed by the head 35 and the center of the head is provided with the small water discharge opening 36 which corresponds to the opening 31 and performs the same function.

In the use of the siphon tube the valve at the outlet end of the tube is closed and it is customary to fill the tube with water necessary for the starting of the siphonic action, by rapidly moving the tube longitudinally backwardly and forwardly while the inlet end of the pipe section 10 is immersed in the water reservoir, until the entire tube is filled with water. In performing this operation the palm of the hand is held over the outlet end of the tube and used as a check valve by uncovering the discharge end of the tube to permit the displaced air to be exhausted during the filling stroke and by closing such end when working the tube in the opposite direction. When the tube becomes filled this fact will be indicated by the flow of the water through the opening in the movable element of the valve unit, such as the opening 31 of the valve plate 29 or the opening 36 of the valve pipe section 33, whereupon the valve may be opened to the desired extent to allow the siphon to transfer water from the reservoir or supply ditch 15 into the irrigation ditch 16 in the manner illustrated in Figure 1.

In siphons of the usual type the discharge tube is customarily longer or larger in diameter than the intake tube. In the present siphon the awkwardness which would result from such a construction is avoided without destroying the efficiency of the siphon by the construction of the ends of the central portion. Employment of the pinched or constricted ends is believed to set up a turbulence which keeps broken up in small particles in the water, any air which may enter the pipe, thus preventing breaking of the siphonic action and effecting continued operation of the device even under a low head differential.

I claim:

1. A siphon tube of the character stated designed to maintain flow under a low head differential comprising a central pipe section and end pipe sections joined to the central section to extend at an oblique angle thereto, the central pipe section being interiorly reduced in diameter at each of its ends, and a flow-control valve closing the outer end of one of said outer pipe sections.

2. In a siphon tube of the character described designed to maintain flow under a low head differential, a central pipe section, outer pipe sections each extending obliquely from an end of the central pipe section, said central pipe section being constricted adjacent each end whereby the interior diameter is materially reduced at each end, the adjacent ends of the central and outer pipe sections being joined by a flange formed around one pipe section and a crimped portion of the adjacent pipe section turned over and enclosing said flange, a metallic sealing means further coupling the adjacent ends of the pipe sections, and a flow-control valve closing the outer end of one of the outer pipe sections.

3. A siphon tube of the character stated designed to maintain flow under a low head differential comprising a central pipe section and outer pipe sections each attached at one end to an end of the central section to extend obliquely therefrom, the several pipe sections together forming a longitudinally arcuate tube, said central pipe section being formed at each of its ends to reduce the interior diameter of such ends, the interior diameter of the central pipe section between the reduced end portions and the interior diameter of each of the end pipe sections being the same, and a valve controlling the outflow of liquid through the outer end of one outer pipe section, said valve including a member supported for movement relative to the said pipe end and said member having a V notch therein through which the liquid flows, the minimum flow of liquid from the pipe passing through the apex end of the notch and increasing for maximum flow through the large end of the notch upon movement of the member in one direction relative to the adjacent pipe end.

JAMES C. NICHOLSON.